T. McGEE.
RAILWAY MOWING MACHINE.
APPLICATION FILED JAN. 16, 1915.
1,158,702.
Patented Nov. 2, 1915.
4 SHEETS—SHEET 1.
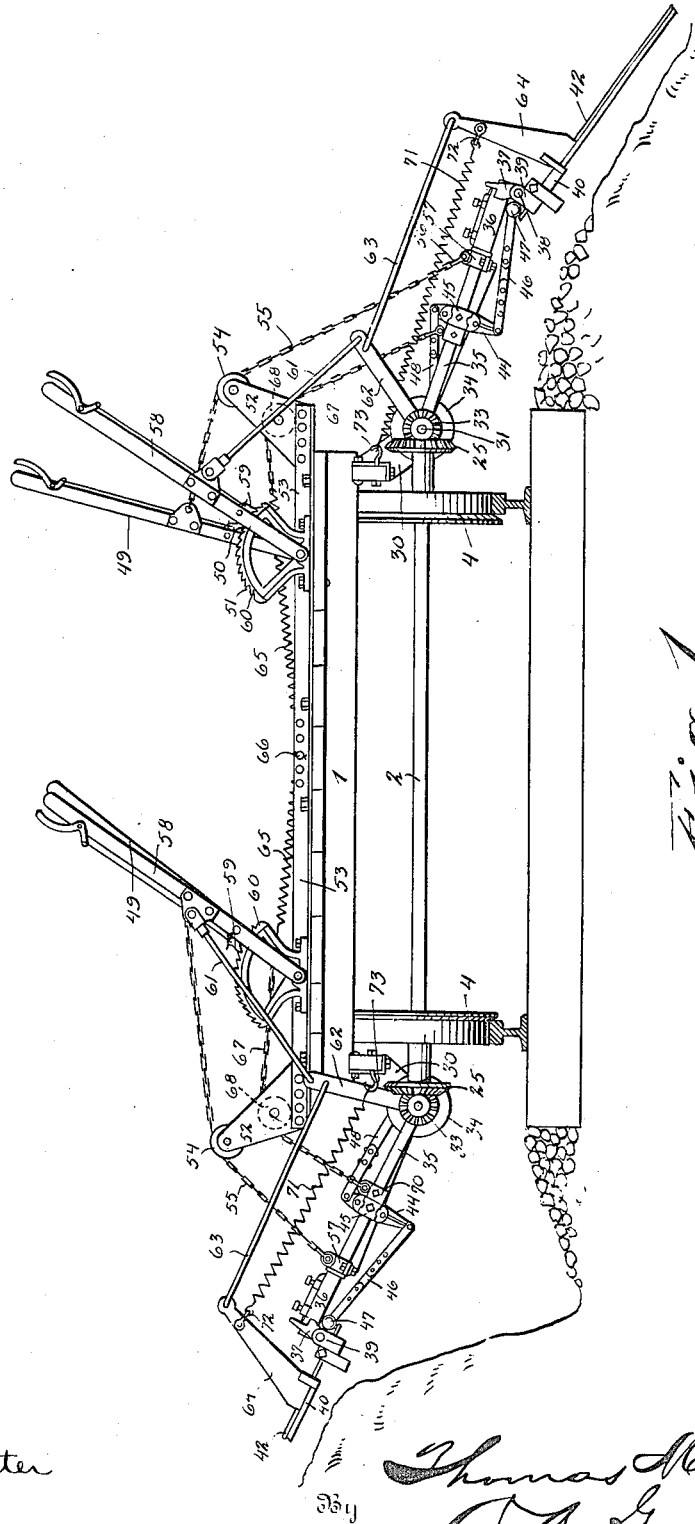
Witnesses
J. Milton Jester
C. Everett
Inventor
Thomas McGee
By J. A. Gourick
Attorney

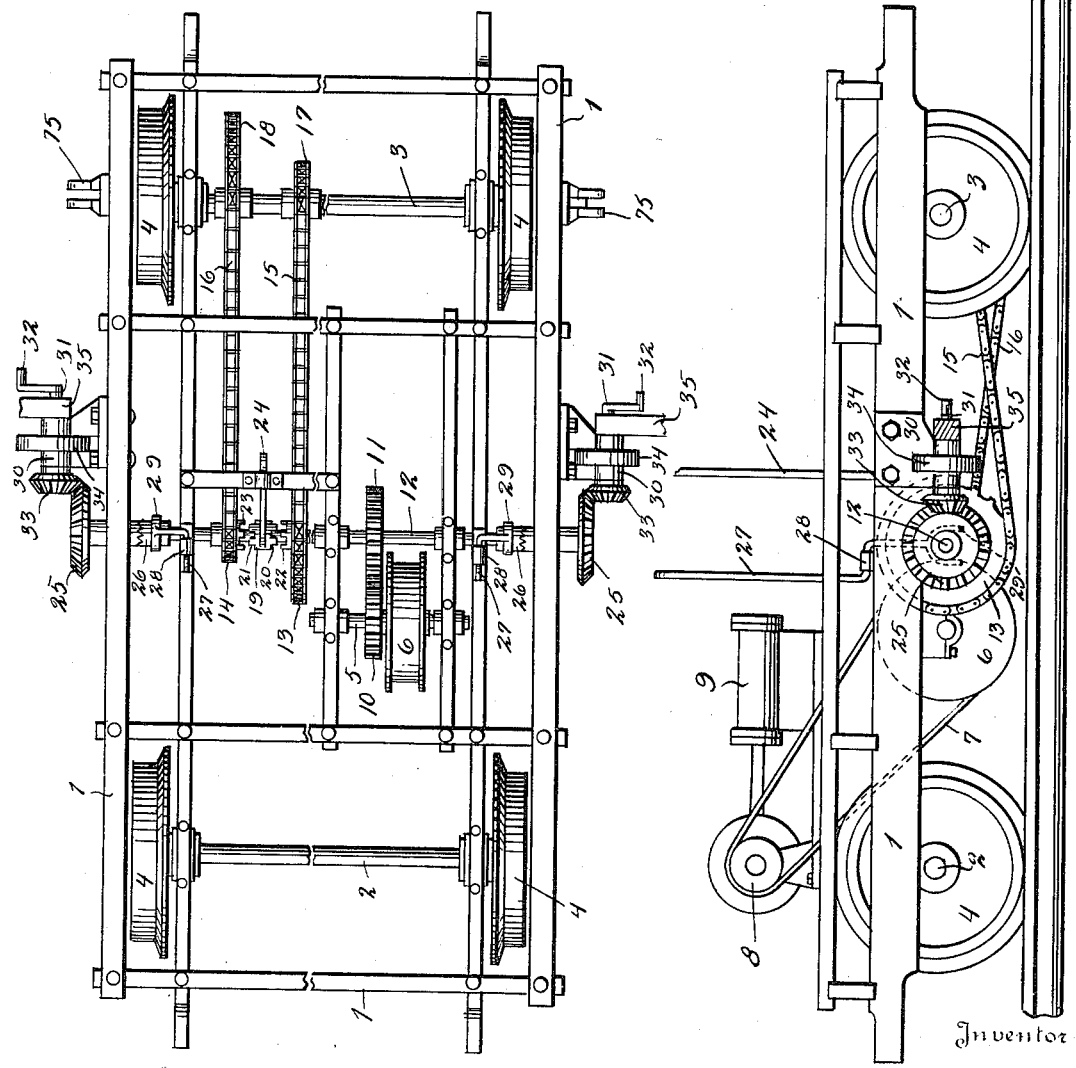

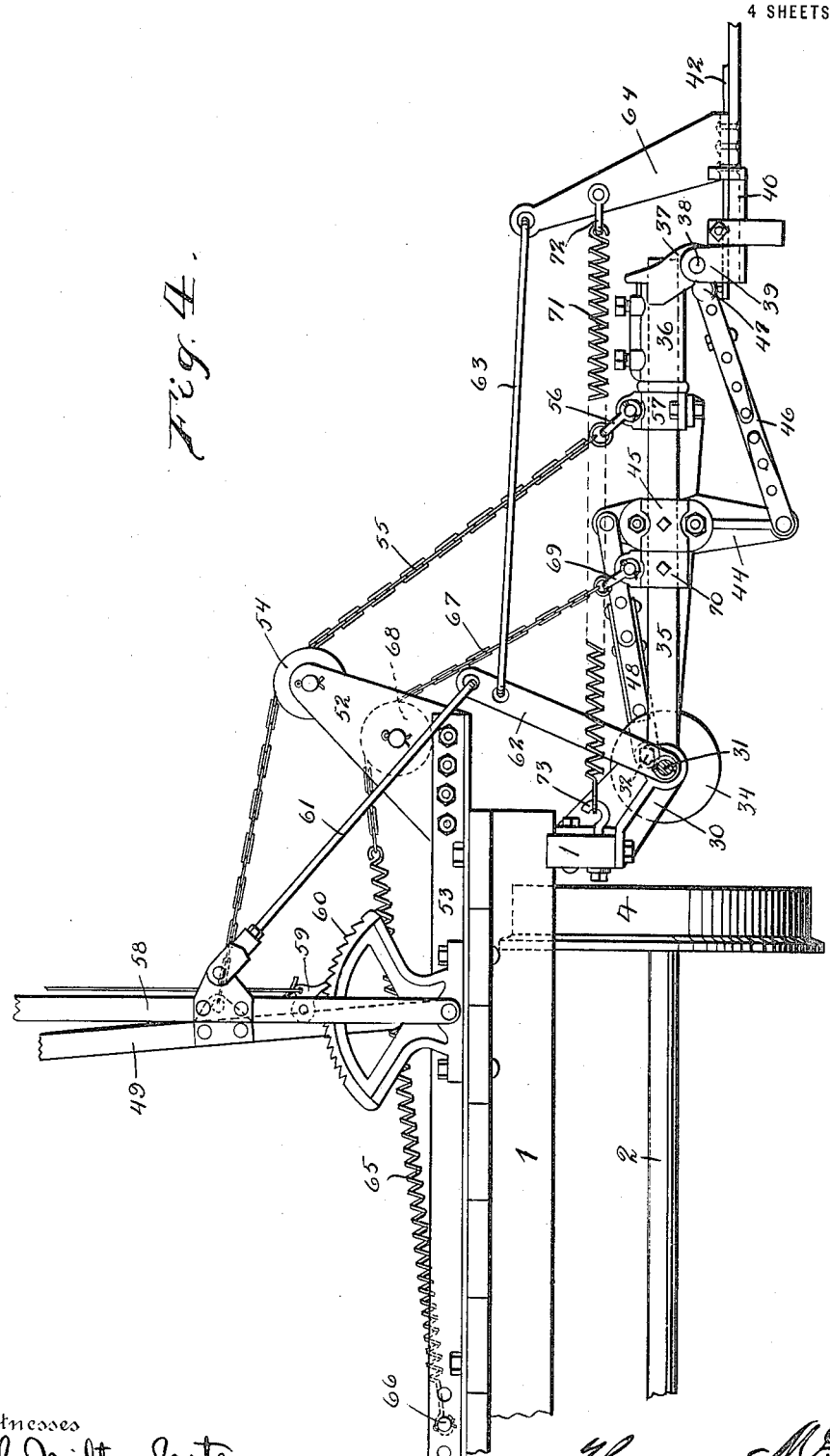

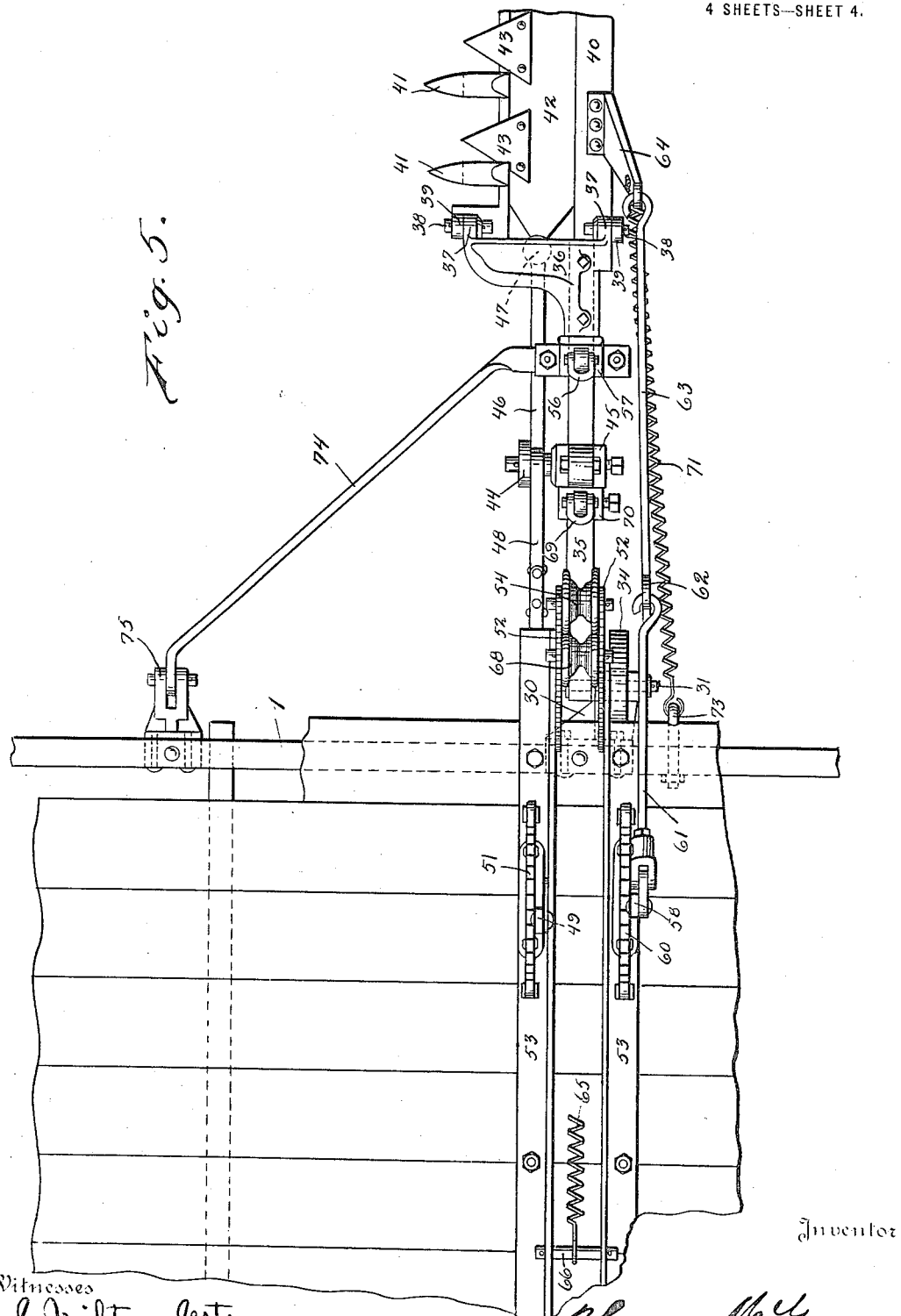

UNITED STATES PATENT OFFICE.

THOMAS McGEE, OF MADISON, SOUTH DAKOTA.

RAILWAY MOWING-MACHINE.

1,158,702.   Specification of Letters Patent.   Patented Nov. 2, 1915.

Application filed January 16, 1915. Serial No. 2,604.

*To all whom it may concern:*

Be it known that I, THOMAS McGEE, a citizen of the United States, residing at Madison, in the county of Lake and State of South Dakota, have invented certain new and useful Improvements in Railway Mowing-Machines, of which the following is a specification.

This invention relates to railway devices, particularly to devices for working upon the road bed, and has for its object the provision of a device adapted to be propelled upon a railroad track and carrying mowing blades actuated by the propelling mechanism whereby grass, weeds and the like growing beside the tracks may be cut.

An important object is the provision of a device of this character in which the mowers are adjustably mounted so that they may be moved into different positions for mowing upon level or inclined surfaces, the mowing mechanism at each side being independently controlled and actuated so that one mower may be thrown out of operation while the other continues to act.

A further object is the provision of a device of this character which will be comparatively simple and inexpensive in manufacture, efficient and durable in service, positive in operation and a general improvement of the art.

With these and other objects and advantages in view, the invention consists in the novel construction and arrangement of parts to be hereinafter more fully described and claimed, and illustrated in the accompanying drawings, in which:

Figure 1 is an end view of the device complete, one mower cutting upon an upwardly inclined bank and the other acting upon a downwardly inclined bank, Fig. 2 is a top plan view of the supporting truck with the floor removed to show the driving mechanism, Fig. 3 is a side elevation thereof, Fig. 4 is an enlarged fragmentary end view showing the mowing mechanism more clearly, and Fig. 5 is a top plan view thereof.

Referring more particularly to the drawings, the numeral 1 designates the frame of the truck which is mounted upon axles 2 and 3 carrying wheels 4. A counter-shaft 5 is journaled in the frame 1 and carries a pulley 6 driven by a belt 7 trained about a pulley 8 driven by any suitable power such as a gas engine 9 mounted on the floor of the truck. A gear 10 is secured upon the shaft 5 and meshes with a gear 11 on a second shaft 12 journaled in the frame 1. When the engine is in operation, the shaft 12 will be driven continuously and at a lower speed than the shaft 5.

The means for propelling the truck comprises large and small sprockets 13 and 14 loose upon the shaft 12 and having trained thereover, respectively, chains 15 and 16 which are in turn trained about sprockets 17 and 18 rigid on the axle 3. A sleeve 19 is splined upon the shaft 12 between the sprockets 13 and 14 and is provided with two clutch faces 20 and 21 adapted to be engaged selectively with clutch faces 22 and 23 formed on the opposing ends of the hub of the sprockets 13 and 14. A lever 24 is pivoted on the frame 1 and terminates at its lower end in a fork disposed within a groove in the sleeve 19. By shifting the lever 24 in one direction the clutch faces 20 and 22 may be engaged for propelling the truck at a high speed, and by shifting the lever 24 in the other direction the clutch faces 21 and 23 may be engaged for propelling the truck at a lower speed.

Secured upon the ends of the shaft 12 are bevel gears 25, the opposing faces of the hubs of which are formed as clutch faces engageable by clutch members 26 splined upon the shaft 12, and movable by means of levers 27 pivoted within brackets 28 on the frame and provided upon their lower ends with forks 29 engaging grooves in the members 26. Secured upon the sides of the frame 1 are outwardly extending brackets 30 journally supporting shafts 31 upon which are provided cranks 32. The other ends of the shafts 31 have secured thereon pinions 33 meshing with the gears 25. Balance wheels 34 are also mounted on the shafts 31.

The mowing mechanism is disposed on both sides of the truck, and as both sides are alike, a description of one side is deemed sufficient. Rotatably mounted on the shaft 31 is an outwardly extending bar 35 which carries upon its end a member 36 provided with downwardly extending ears 37 to which are pivoted, as shown at 38, upwardly extending ears 39 on a guide bar 40 provided with the usual mower knife guards 41. A reciprocatory sickle bar 42 carrying a plurality of mower knives 43 is slidable upon the guide bar 40.

The sickle bar is actuated by means of a walking beam 44 pivoted upon a sleeve 45 secured upon the bar. The lower end of the walking beam 44 is pivotally connected with one end of a connecting rod 46 which has its other end connected with the sickle bar 42 by a ball and socket connection 47. A pitman 48 is pivotally connected with the upper end of the walking beam 44 and with the crank 32 on the shaft 31. It will be seen that rotation of the shaft 31 through the medium of the gears 25 and 33 will cause the sickle bar 42 to slide back and forth upon the guide bar 40.

In order that the bar 35 may be raised or lowered, I provide a lever 49 pivoted upon the truck having a spring pressed manually releasable pawl 50 engaging a segmental rack 51. A bracket 52 is secured to angle bars 53 mounted on the truck and has a roller 54 journaled therein. A chain 55 is connected with the lever 49, is trained over the roller 54 and has its free end connected with an eye 56 pivoted on a sleeve 57 carried by the bar 35. By moving the lever 49 the bar 35 may be raised or lowered to any desired position and maintained in such position by the pawl and rack.

In order that the guide bar 40 may be tilted to any desired angle, I provide a second lever 58 pivoted upon the truck and having a manually releasable spring pressed pawl 59 engaging a segmental rack 60. A link 61 is pivotally connected with the lever 58 and with the outer end of an arm 62 revoluble upon the shaft 31. A second link 63 is connected with the arm 62 and with the upper end of a lug 64 rigidly secured to the guide bar 40. By moving the lever 58 back or forward, the guide bar 40 may be tilted, and maintained in the desired position by the pawl and rack.

In order that the weight of the bar 35 and its associated parts may be counterbalanced to reduce the effort required to shift its position, I provide a spring 65 connected at one end with a bolt 66 extending across the angle bars 53, and connected at its other end with a chain 67 trained over a roller 68 journaled in the bracket 52, the free end of the chain being connected with an eye 69 pivoted upon a sleeve 70 carried by the bar 35. Similarly, the weight of the guide bar 40 and sickle bar 42 is counterbalanced by a spring 71 connected at one end with an eye 72 pivoted upon the lug 64 and connected at its other end with a hook 73 extending from the frame 1.

In order that the mowing mechanism may be braced against displacement, I provide a bar 74 connected with the bar 35 and pivoted upon a bracket 75 secured upon the frame 1.

The operation of the device is as follows: The levers 49 and 58 are moved by the operator so as to adjust the positions of the bar 35 and guide bar 40 so that the guide bars, and consequently the sickle bars, will be parallel with the surface to be mowed. On a single track the mowing mechanism on both sides would be adjusted for use, whereas on a double track the mechanism on the right hand side only would be used with that on the other side made inoperative. The proper adjustment being made, the corresponding lever 27 is moved to engage the clutch member 26 with the clutch face on the hub of the gear 25. The rotation of the engine, counter-shaft 5 and shaft 12 will then be imparted to the shaft 31 through the medium of the gears 25 and 33 and the cutter bar 42 will be reciprocated through the medium of the pitman 48, walking beam 44 and connecting rod 46. When cutting upon level ground the bars 35 and 40 would be arranged horizontally while when cutting upon inclined surfaces the bars would be arranged at an angle, as shown in Fig. 1 of the drawings.

From the foregoing description and a study of the drawings it will be apparent that I have thus provided a mowing machine for railroad use adapted to mow upon one or both sides of a track simultaneously or independently and which is adjustable for mowing upon level or inclined surfaces. It will also be apparent that the degree of movement of the bar 26 and cutter guide 40 may be regulated by adjusting the sleeves 29 and 61 longitudinally upon the bar 26 whereby practically all conditions under which mowing would be done may be readily and easily met.

Having thus described my invention what I claim is:

1. In a device of the character described comprising a truck adapted to travel on a railroad track, bars pivotally mounted on the sides of said truck, cutter guides pivotally mounted on said bars, means for adjusting the angular positions of said bars, and cutter bars adapted to reciprocate upon said cutter guides, means for actuating said cutter bars, said means comprising a power driven shaft, clutches adjacent the ends of said shaft, beveled gears on the ends of said shaft, said gears being in mesh with other beveled gears on short shafts mounted in brackets secured to the truck, cranks formed on the other ends of said last named shafts, pitmans connected with said cranks and with walking beams, and links connecting the other ends of said walking beams with said bars.

2. A device of the character described comprising a truck adapted to travel on a railroad track, bars pivotally mounted on the sides of said truck, means for adjusting the angular positions of said bars, cutter guides pivotally mounted on said bars, and means for adjusting the angular positions of said guides, said means comprising levers pivoted upon said truck, links connecting said levers with arms revolubly mounted on shafts on the sides of said truck, and other links connecting said arms with lugs rigidly secured to said guides.

3. A device of the character described comprising a truck adapted to travel on a railroad track, bars pivotally mounted on the sides of said truck, flexible means for adjusting the angular positions of said bars to a point below or above their pivot points, cutter guides pivotally mounted on said bars, rigid means for adjusting the angular positions of said guides, cutter bars adapted for reciprocation upon said guides, and means for actuating said cutter bars, the adjusting means being independent for each of said bars and guides, and said cutter bar actuating means being independent.

In testimony whereof I hereto affix my signature in the presence of two witnesses.

THOMAS McGEE.

Witnesses:
J. F. BLEWITT,
MARIE T. ZENGERLE.